Dec. 15, 1942.   J. M. HOTHERSALL   2,304,825
CAN BODY MAKING MACHINE
Filed Dec. 14, 1940   2 Sheets-Sheet 2
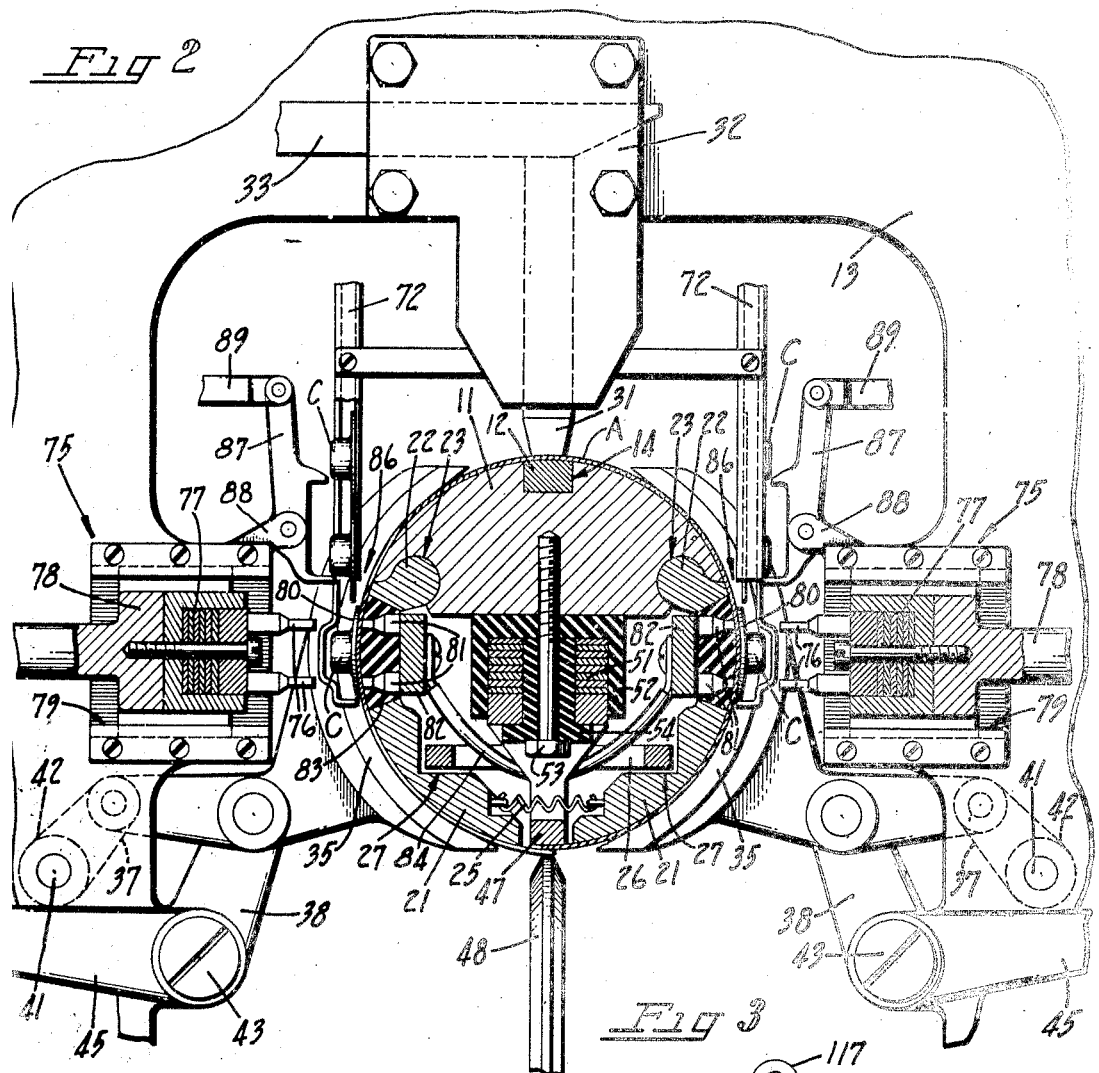
INVENTOR.
John M. Hothersall
BY Ivan D. Thornburgh
Chas. H. Erne
ATTORNEYS Patented Dec. 15, 1942

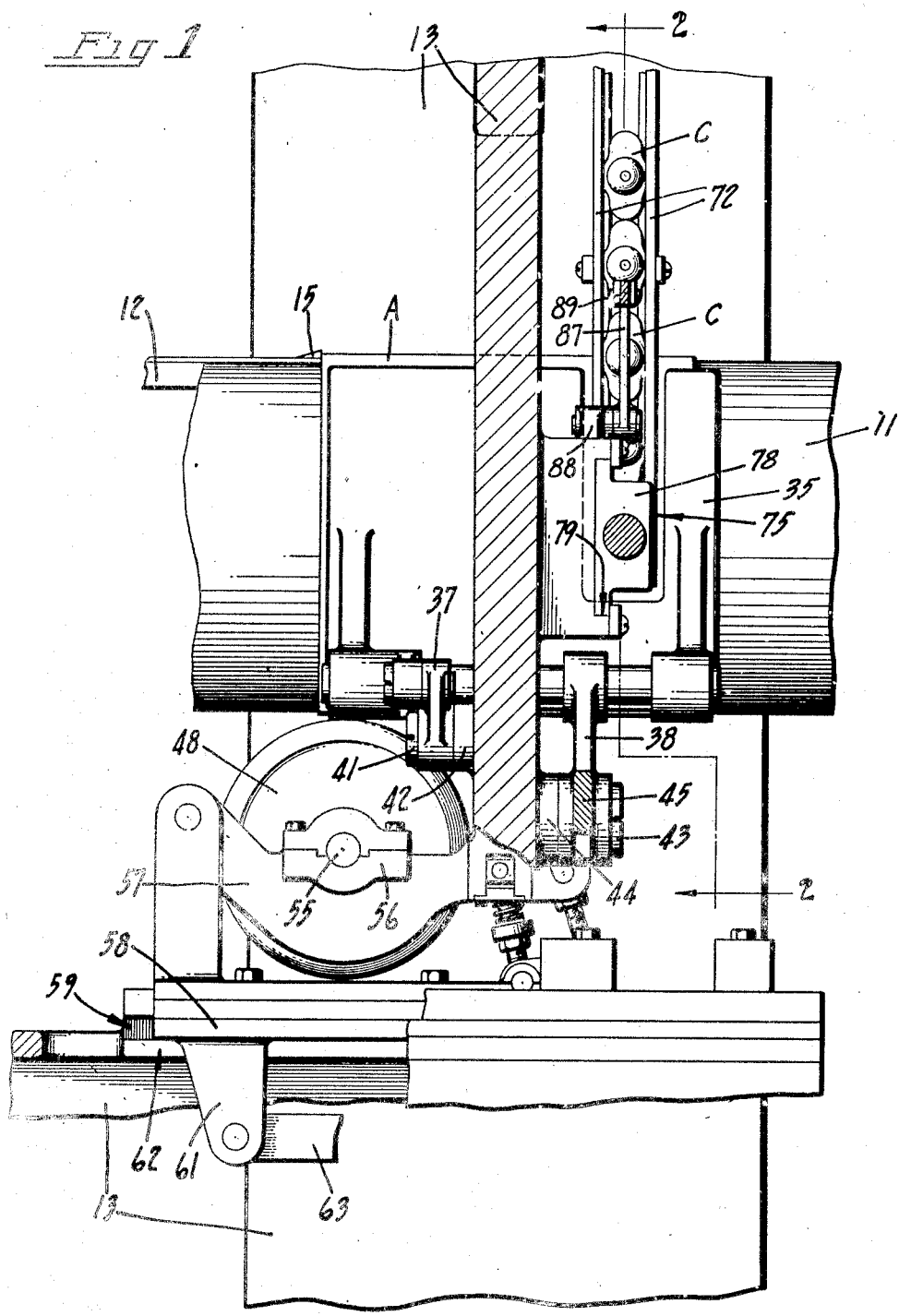

2,304,825

UNITED STATES PATENT OFFICE 2,304,825

CAN BODY MAKING MACHINE

John M. Hothersall, Brooklyn, N. Y., assignor to American Can Company, New York, N. Y., a corporation of New Jersey Application December 14, 1940, Serial No. 370,225

6 Claims. (Cl. 219—6)

The present invention relates to a container or can body making machine and has particular reference to making can bodies having bail ears welded to them and having welded side seams.

An object of the invention is the provision of a can body making machine wherein individual bail ears are welded to tubular can bodies while the bodies are in processional order on the usual forming horn used in such machines so that the bail ears will be accurately positioned on the body in a more efficient and more economical manner, thus eliminating expensive separate bail ear handling and attaching operations.

Another object is the provision of such a machine wherein the side seam of the can body is welded simultaneously with the welding of the bail ears so that both welding operations may be effected at the same station in the machine thereby combining high speed production and accuracy to produce a better product.

Numerous other objects and advantages of the invention will be apparent as it is better understood from the following description, which, taken in connection with the accompanying drawings, discloses a preferred embodiment thereof.

Referring to the drawings:

Figure 1 is a part sectional, part elevational view of a machine embodying the instant invention, with parts broken away;

Fig. 2 is a transverse sectional view taken substantially along the broken line 2—2 in Fig. 1, with parts broken away;

Fig. 3 is a wiring diagram of the electrical circuits used in the machine; and

Fig. 4 is a perspective view of a can body produced by the machine.

As a preferred embodiment of the invention the drawings illustrate principal parts of a can body making and electric welding machine of the character disclosed in my United States Patent 2,047,964, issued July 21, 1936, on Electric welding.

In the machine, partially made tubular can bodies A of sheet metal, such as tin plate or the like, are advanced along a horn or mandrel 11 (Figs. 1 and 2) in a step-by-step or intermittent manner by a reciprocating feed bar 12. The bodies shown in the drawings are preferably of cylindrical shape and in certain stages have their side seam edges unsecured, and spread apart adjacent the bottom of the horn for convenience in advancing the bodies along the horn, although the invention is equally well adapted to other shapes of can bodies.

The horn 11 is suitably supported in a frame 13 which constitutes the main frame of the machine. The feed bar 12 is disposed in a groove 14 formed in the horn or mandrel and is reciprocated in any suitable manner in time with the other moving parts of the machine, preferably as disclosed in the above mentioned patent. Feed dogs 15 are carried in the feed bar at spaced intervals along its length for engaging behind the can bodies to advance them along the horn when the feed bar moves through a feeding stroke.

During the advancement of a can body A along the horn, it is moved into a welding station illustrated in Figs. 1 and 2. At this station the lower portion of the horn is cut away and a pair of expanding sizing wings 21 extend down into this cut-away portion. The upper edges of the wings are rounded to form heads 22 and these heads operate in sockets 23 formed in the horn so that the wings may hinge outwardly.

The lower ends of the sizing wings 21 are connected by a tension spring 25. This spring draws the wings inwardly against an expander cam slide 26 disposed in notches 27 formed in the wings. This slide is formed with cam sections which operate against cooperating cam sections in the wing notches and is of the same construction and operation as disclosed in my above mentioned patent.

Hence when a can body A is shifted into the welding station the cam slide 26 is moved to expand the sizing wings 21 to the proper size for the can body. During this expanding operation the body is clamped to the horn so that it will not shift out of place. This is done by a clamp bar 31 which is disposed in a bearing block 32 on the main frame above the horn. The clamp bar is forced down against the body and the horn by a sliding wedge member 33 disposed in the bearing block 32. The wedge member is actuated in any suitable manner in time with the other moving parts of the machine.

The sides of the clamped can body A are forced inwardly against the horn 11 and the expanded sizing wings 21 to bring the can body to proper size and to overlap the side seam edges of the body. This is brought about by a pair of clamping wings 35 which are located one on each side of the horn. Each clamping wing is mounted on a pair of near parallelogram levers 37, 38 so that the wing will move in substantially horizontally against the body. Lever 37 is mounted on a pivot screw 41 secured in a boss 42 formed on the main frame 13. Lever 38 is mounted on a pivot stud 43 threaded into a boss 44 formed on the main frame. The lever 38 is oscillated on the pivot screw by an arm 45 which is formed on the lever and which is actuated in any suitable manner in time with the other moving parts of the machine.

While the can body A is thus held to size and clamped against the horn its overlapped side seam edges are secured together by electric welding to form a continuous hermetic side seam B (Fig. 4). This welding is preferably effected by an inside stationary welding electrode 47 and an outside movable wheel or disc electrode 48.

The inside electrode 47 is preferably of the bar type and extends longitudinally of the horn and between the lower ends of the sizing wings 21, as best shown in Fig. 2. This electrode also extends up into the cut-away portion of the horn and engages against a laminated bus bar 51 which is enclosed in a box insulator 52. The insulator, the bus bar, and the electrode are bolted to the horn by bolts 53 which extend through insulating sleeves 54 so that the bus bar, and the electrode will be entirely insulated from the horn. The bus bar extends back through the horn to a place where it can be secured to a suitable source of electric energy without interference with the can bodies moving along the horn.

The disc electrode 48 is preferably mounted on a rotor shaft 55 (Fig. 1) which is carried in bearings 56 formed in a cradle 57. The cradle is carried in an electrode slide 58 disposed in a runway 59 which extends longitudinally of the horn 11 and which is formed in the main frame 13. The slide is formed with a lug 61 which extends down through an opening 62 in the main frame and connects with a link 63. The link may be actuated in any suitable manner in time with the other moving parts of the machine.

Hence when a can body A is sized and clamped to the horn 11 the electrode slide 58 moves along its slideway and thus rolls the disc electrode 48 along the overlapped and held side seam edges of the can body. The electrode is connected to a suitable source of electric energy as will be more fully explained in connection with the wiring diagram in Fig. 3. Hence the rolling electrode presses the edges of the can body against the inside stationary electrode 47 and thus an electric welding current is transmitted through the can body edges and it is this current or energy that welds the edges together in the tight side seam B hereinbefore mentioned.

The welding of the can body side seam is preferably effected in one pass or movement of the disc electrode along the seam. After such a pass or movement the electrode slide 58 remains at the end of its stroke until the next can body is brought into the welding station for welding. In this manner the necessity of having the electrode pass back on an idle stroke over a welded seam is eliminated.

During this welding of the can body side seam, a pair of bail ears C are brought into proper position against the can body and are secured in place by a welding operation. These bail ears are delivered into place one on each side of the body at a predetermined distance from the end of the body by way of chutes or runways 72. There are two of these chutes, one on each side of the body and they terminate in a horizontal plane which extends through the middle of the sized body so that the lowermost ears in the chutes may be attached to the body in diametrically opposed positions.

Adjacent the terminal ends of the chutes there is disposed an ear electrode unit 75 (Fig. 2) having a pair of vertically spaced electrodes 76. These electrodes are in line with the top and bottom of the flange part of the lowermost ear in each chute. Such electrodes constitute the outer ear electrodes and receive electric welding energy by way of a flexible laminated bus bar 77 connected with each.

The ear electrode units 75 are carried in and are insulated from horizontal slides 78 which operate in slideways 79 formed in the main frame 13. The slides may be operated in any suitable manner in time with the other moving parts of the machine. Hence when the slides move toward the horn 11 the outer ear electrodes 76 engage the flange part of the lowermost bail ears 80 in the chutes and press them against the can body A for the welding operation.

These outer ear electrodes 76 cooperate with similar sets of inner ear electrodes 81 which are formed on inner electrode units 82 disposed inside the horn. There are two of these inner electrode units and they are carried in insulating blocks 83 which are secured in the sizing wings 21. These inner electrode units are connected together by a wire 84.

Contact of the outer ear electrodes 76 with the inner ear electrodes 81 through the bail ears and the can body interposed between them completes a welding circuit which will be more fully explained in connection with the wiring diagram in Fig. 3. Electric energy passing through this circuit welds the ears to the can body.

After this bail ear welding operation the welded can body is released by contraction of the sizing wings 21 and is thereupon advanced along the horn 11 for further operations. As the body moves out of the welding station the ears secured to the body leave the chutes by way of openings 86 formed in the sides thereof.

Provision is made to prevent the next above bail ears in the chutes from immediately falling down to their place in the bottom of the chutes before the next following can body is brought into the welding station. This is brought about by movable holding or escapement fingers 87 which are pivoted on lugs 88 formed on the main frame 13.

The fingers are formed with spaced hook sections which engage under the bail ear next above the lowermost one in each chute and this holds up the entire stack on each side until released by a rocking of the respective fingers. This releases only one ear at a time in each chute for attachment to the can body in the welding station at that time. Actuation of the fingers at the proper time may be effected in any suitable manner as by links 89 which may be operated in time with the other moving parts of the machine.

The welding circuits for effecting the welding operations are preferably divided into two simple separated circuits although both circuits could be readily combined into one unitary circuit if desired. These circuits comprise a side seam welding circuit Y and an ear welding circuit Z (Fig. 3).

The side seam welding circuit Y includes the stationary electrode 47 and the disc or movable electrode 48. The stationary electrode is connected by a wire 101 to one side of the secondary of a high voltage transformer 102. The other side of the secondary is connected by a wire 103 to the disc electrode. The primary side or winding of the transformer is connected by wires 104, 105 to a source of electric energy which may be a generator 106.

Hence when the disc electrode 48 comes into engagement with the overlapped side seam edges of a can body and presses them against the stationary electrode 47, as hereinbefore explained, the side seam welding circuit is closed and the welding current from the transformer 102 passes along the circuit. It is this current that welds the side seam, as hereinbefore explained.

The ear welding circuit Z includes the two inner ear electrode units 82 which are connected together by the wire 84 and the two outer ear electrode units 75. In this circuit the outer ear electrode units are connected by wires 111, 112 to the secondary side or winding of a low voltage transformer 114. The primary side or winding of the transformer is connected by wires 115, 116 to a suitable source of electric energy, such as for example, a generator 117.

Hence, when the outer ear electrodes 76 of the units 75 press the ear flanges against the can body, and the can body against the inner ear electrodes 81 of the units 82 as hereinbefore explained, the ear welding circuit Z is closed and the welding energy from the transformer 114 thereby passes along the circuit. It is this energy that welds the ears to the body as hereinbefore explained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for producing tubular sheet metal can bodies having bail ears secured thereto, comprising a horn for supporting a can body at a welding station, movable sizing wings in the horn for expanding the can body to a predetermined size, means at said station for overlapping the side seam edges of the sized body, devices also at said station for delivering bail ears into position adjacent the can body, seam welding electrodes at the station for welding the overlapped edges of the body into a hermetic side seam, inner ear welding electrodes secured in said sizing wings in the horn, cooperating outer ear welding electrodes disposed outside said horn, and means for supporting said outer ear welding electrodes and for moving them into welding engagement with the bail ears to secure the ears in place on the can body.

2. A machine for electric welding side seams and bail ears on tubular sheet metal can bodies, comprising means for advancing the can body toward a welding station, means for delivering bail ears to said station adjacent opposite sides of a positioned can body, means at said station for sizing the can body for the reception of said ears and to align adjacent edges of said body for a side seam, and means at said station for electrically welding said side seam and the positioned ears on said body while the latter is momentarily at said station, to provide a completely welded can body.

3. A machine for electric welding side seams and bail ears on tubular sheet metal can bodies, comprising means for advancing the can body toward a welding station, means for feeding bail ears to said station adjacent opposite sides of a positioned can body, means at said station for sizing the can body for the reception of said ears and to align adjacent edges of said body in an overlapped side seam, means at said station for electrically welding said aligned overlapped side seam, and means at said station movable by said sizing means into welding engagement with a positioned can body for simultaneously electrically welding a pair of positioned ears on opposite sides of said body, to provide a completely welded can body at said station in a single operation.

4. A machine for electric welding side seams and bail ears on tubular sheet metal can bodies, comprising a horn for supporting a can body at a welding station, means for successively advancing said bodies on said horn toward said station, means for feeding bail ears to said station adjacent opposite sides of a positioned can body, means movably mounted on said horn at said station engageable with the interior body wall for sizing the can body to desired diameter for the reception of said ears and to align adjacent edges of said body for a side seam, inner and outer seam welding electrodes at said station for electrically welding said aligned body edges in a side seam joint, inner and outer ear welding electrodes at said station on opposite sides of said horn, the inner of said ear welding electrodes being mounted on said sizing means, and means for moving said ear welding electrodes into welding association with a pair of oppositely disposed positioned ears for welding the latter on said body while the body is momentarily at said station for the side seam welding operation.

5. A machine for electric welding side seams and bail ears on tubular sheet metal can bodies, comprising a horn for supporting a can body at a welding station, means for successively advancing said bodies on said horn toward said station, a pair of spaced magazine chutes disposed at said station for delivering bail ears to adjacent opposite sides of a positioned can body, escapement devices associated with said chutes for individually releasing the delivered bail ears, means pivotally mounted on said horn engageable with an interior body wall at said station for sizing the can body to desired diameter for the reception of said released ears and to align adjacent edges of said body for a side seam, inner and outer seam welding electrodes at said station for electrically welding said aligned body edges in a side seam joint, inner and outer ear welding electrodes at said station on opposite sides of said horn, the inner of said ear welding electrodes being carried by and movable with said sizing means, and means for moving said outer ear welding electrodes into welding engagement with said pair of released positioned bail ears for welding said ears on the body coincidentally with the side seam welding operation and while said can body is momentarily at said station, to provide a completely welded can body.

6. A machine for electric welding side seams and bail ears on tubular sheet metal can bodies, comprising a horn for supporting a can body at a welding station, means for successively advancing said bodies on said horn toward said station, means for delivering bail ears to said station adjacent opposite sides of a momentarily positioned can body, means movably mounted on said horn at said station engageable with the interior body wall for sizing the positioned body to desired diameter for the reception of said ears and to align adjacent edges of said body in a side seam, seam welding electrodes at said station for welding together the aligned edges of the body in a hermetic side seam joint, ear welding electrodes at the station on opposite sides of said horn for welding a pair of delivered bail ears to said body, and electrical conducting means connecting with said seam and ear welding electrodes for substantially simultaneously performing the side seam and ear welding operations.

JOHN M. HOTHERSALL.